(12) United States Patent
Vaman et al.

(10) Patent No.: US 8,993,020 B2
(45) Date of Patent: Mar. 31, 2015

(54) CONFECTIONERY AND METHODS OF PRODUCTION THEREOF

(75) Inventors: Shama Karu Vaman, London (GB); Sarah Jayne Prestwood Pearson, Canberra (AU); Clive Richard Thomas Norton, Shinfield (GB); Carole Jean Elleman, Reading (GB)

(73) Assignee: Cadbury UK Limited (GB)

( * ) Notice: Subject to any disclaimer, the term of this patent is extended or adjusted under 35 U.S.C. 154(b) by 0 days.

(21) Appl. No.: 13/070,105

(22) Filed: Mar. 23, 2011

(65) Prior Publication Data

US 2011/0244082 A1  Oct. 6, 2011

Related U.S. Application Data

(63) Continuation of application No. PCT/GB2009/002243, filed on Sep. 22, 2009.

(30) Foreign Application Priority Data

Sep. 23, 2008 (GB) .................................. 0817365.0

(51) Int. Cl.
*A23L 1/36* (2006.01)
*A23G 1/04* (2006.01)
(Continued)

(52) U.S. Cl.
CPC ................ *A23G 1/0056* (2013.01); *A23G 1/32* (2013.01); *A23G 1/40* (2013.01); *A23G 1/52* (2013.01); *A23G 1/54* (2013.01); *A23L 1/0076* (2013.01)
USPC ............................. 426/93; 99/450.6; 426/631

(58) Field of Classification Search
CPC ....... A23G 2200/08; A23G 3/54; A23G 1/56; A23G 1/54; A23G 3/545; A23G 1/04; A23G 1/0006; A23G 1/18; A23G 2220/00; A23P 1/125; A23P 1/087; A23P 1/085; A23P 1/144; A23L 1/0076
USPC ................................... 426/93, 631; 99/450.6
See application file for complete search history.

(56) References Cited

U.S. PATENT DOCUMENTS 3,644,169 A   2/1972 Phillips
4,569,848 A   2/1986 Giorgetti et al.
(Continued)

FOREIGN PATENT DOCUMENTS

EP   0232156 A2   8/1987
EP   0251630 A2   1/1988
(Continued)

OTHER PUBLICATIONS

Search Report GB0817365.0; Date of Search: Dec. 22, 2008; 2 pages.
(Continued)

*Primary Examiner* — D. Lawrence Tarazano
*Assistant Examiner* — Katherine D Leblanc
(74) *Attorney, Agent, or Firm* — Cantor Colburn LLP

(57) ABSTRACT

The invention relates to a chocolate confectionery product comprising an extruded body portion, the body portion having at least one capillary or cavity disposed therein, the extruded body portion comprising a first chocolate component and the capillary or cavity containing a second chocolate component, wherein the first component is more stable at elevated temperatures than the second component. The invention also related to a process for the manufacture of the same.

27 Claims, 6 Drawing Sheets

(51) Int. Cl.

| | |
|---|---|
| *A21C 9/06* | (2006.01) |
| *A23G 1/00* | (2006.01) |
| *A23G 1/32* | (2006.01) |
| *A23G 1/40* | (2006.01) |
| *A23G 1/52* | (2006.01) |
| *A23G 1/54* | (2006.01) |
| *A23L 1/00* | (2006.01) |

(56) References Cited

U.S. PATENT DOCUMENTS

| | | |
|---|---|---|
| 5,126,157 A | 6/1992 | Burwell et al. |
| 5,492,710 A | 2/1996 | Seyam |
| 5,965,179 A | 10/1999 | Ducret et al. |
| 2004/0185158 A1 | 9/2004 | McHugh et al. |
| 2005/0118304 A1 | 6/2005 | Rasmussen |
| 2007/0104828 A1 | 5/2007 | Fornaguera |
| 2008/0095899 A1 | 4/2008 | Fornaguera |
| 2011/0217413 A1 | 9/2011 | Vaman et al. |
| 2011/0217423 A1 | 9/2011 | Vaman et al. |
| 2011/0217427 A1 | 9/2011 | Vaman et al. |
| 2011/0217428 A1 | 9/2011 | Vaman et al. |
| 2011/0293795 A1 | 12/2011 | Vaman et al. |
| 2013/0101649 A1 | 4/2013 | Clarke et al. |
| 2013/0101707 A1 | 4/2013 | Clarke et al. |
| 2013/0108740 A1 | 5/2013 | Clarke et al. |
| 2013/0115338 A1 | 5/2013 | Clarke et al. |

FOREIGN PATENT DOCUMENTS

| | | |
|---|---|---|
| EP | 0674834 A2 | 10/1995 |
| EP | 0775446 A2 | 5/1997 |
| EP | 2108262 A1 | 10/2009 |
| EP | 2153726 A1 | 2/2010 |
| GB | 0223362 | 10/1924 |
| GB | 262687 | 12/1926 |
| GB | 656535 | 11/1949 |
| GB | 2136666 A | 9/1984 |
| GB | 2307165 A | 5/1997 |
| GB | 2437415 A | 10/2007 |
| JP | 2004057143 A | 2/2004 |
| RU | 67820 U1 | 11/2007 |
| WO | 0234054 A2 | 5/2002 |
| WO | 02056698 A1 | 7/2002 |
| WO | 03005832 A1 | 1/2003 |
| WO | 03086094 A1 | 10/2003 |
| WO | 2005056272 A1 | 6/2005 |
| WO | 2005117601 A2 | 12/2005 |
| WO | 2006100516 A1 | 9/2006 |
| WO | 2008031798 A2 | 3/2008 |
| WO | 2008044122 A2 | 4/2008 |
| WO | 2011117635 A1 | 9/2011 |
| WO | 2011117639 A1 | 9/2011 |
| WO | 2011117640 A1 | 9/2011 |
| WO | 2012098401 A1 | 7/2012 |
| WO | 2013042028 A1 | 3/2013 |

OTHER PUBLICATIONS

International Search Report; International Application No. PCT/GB2009/002243; Date of Mailing: Jan. 25, 2010, 4 pages.
Written Opinion of the International Searching Authority; International Application No. PCT/GB2009/002243; International Filing Date: Sep. 22, 2009; 7 pages.
JP59066842A; Apr. 16, 1984; Abstract Only (1 page); XP002640622.
Pyler E J: "Baking Science & Technology, Danish Pastry Products", Jan. 1, 1988, Baking Science & Technology, Sosland Publishing, Kansas City, USA, pp. 1059-1061, XP002539560.
WO 2009056727; May 7, 2009; Abstract Only (1 page).
21 CFR 163 Cacao products, § 163.123, § 163.124, and § 163.130, current as of Nov. 27, 2013, downloaded from http://www.ecfr.gov/cgi-bin/text-idx?c=ecfr&SID=f8a075e9a965c3ee0336f09624abe28c&rgn=div5&view=text&node=21:2.0.1.1.36&idno=21#_top; 5 pages.
Chocolate_vs_Compound, Blommer Chocolate Company, Aug. 2011, downloaded on Nov. 26, 2013 from http://www.blommer.com/services_research_library.html#CompoundVsChocolate. 1 page.

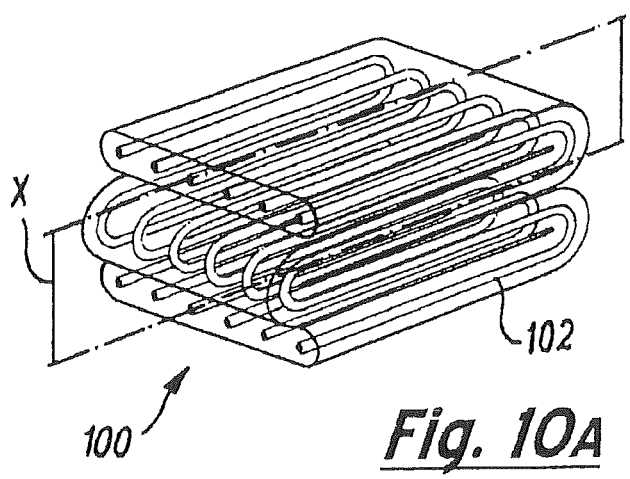
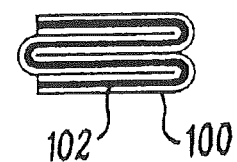
Fig. 10A
Fig. 10B
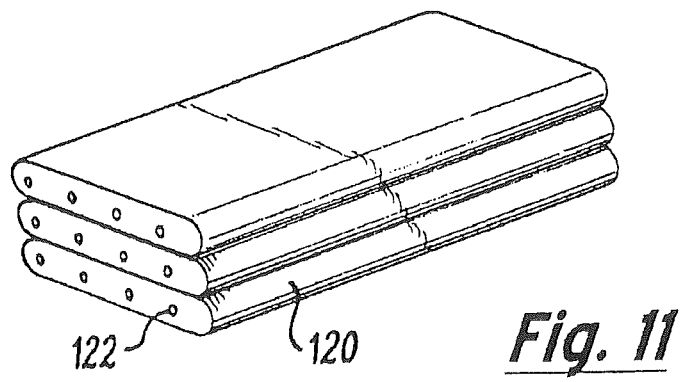
Fig. 11

CONFECTIONERY AND METHODS OF PRODUCTION THEREOF

CROSS REFERENCE TO RELATED APPLICATIONS

This application is a continuation of International Application No. PCT/GB2009/002243, filed on Sep. 22, 2009, which claims priority under 35 U.S.C. §119(a) and 35 U.S.C. §365(b) to United Kingdom Application No. 0817365.0, filed on Sep. 23, 2008, the disclosure of each of which is incorporated herein in its entirety by reference.

TECHNICAL FIELD OF THE INVENTION

The present invention relates to chocolate confectionery and methods of production thereof. In particular, the invention relates to novel chocolate confectionery formulation which can be stored at elevated temperatures.

BACKGROUND TO THE INVENTION

It is desirable to produce a chocolate confectionery product which has a degree of temperature tolerance, so that it can be enjoyed in hotter regions of the world. Typically, milk chocolate becomes soft and flows at temperatures in excess of 33° C. Many countries around the world often experience higher temperatures on a regular basis, thus requiring storage of products in refrigeration units. Furthermore, if a chocolate confectionery product is placed in a pocket of a garment which is being worn by an individual, the temperature of the pocket is often close to body temperature (approximately 36° C.).

It is an aim of an embodiment or embodiments of the present invention to overcome one or more of the problems of the prior art.

SUMMARY OF THE INVENTION

According to an embodiment of the present invention, there is provided a chocolate confectionery product comprising an extruded body portion, the body portion having at least one capillary or cavity disposed therein, the extruded body portion comprising a first chocolate component and the capillary or cavity containing a second chocolate component, wherein the that component is more stable at elevated temperatures than the second component.

The present invention therefore provides for a chocolate confectionery product which can tolerate elevated temperatures.

The term "more stable" is intended to mean that one component can resist a change in state (for example from a solid to a liquid) more than another component.

When the first and second chocolate components are mixed together in the mouth of an individual, the chocolate product may provide the taste and texture of chocolate as both are components of chocolate. In fact, the initial chewing of the product may provide an enhanced sensory feel in the mouth.

In an embodiment of the present invention, the first and second components jointly comprise all the common components used to make chocolate. The term "chocolate confectionery" is intended to mean a confectionery product which comprises a confectionery composition which includes all the common components used to make chocolate. It is to be understood that separating components of chocolate in the confectionery product, in accordance with the present invention, may result in a product which is not strictly defined as "chocolate" (whether milk, dark or otherwise) by certain regulatory or legal bodies which define chocolate as having very specific characteristics and ingredients. However, analytical analysis would confirm that the composition includes all compounds which traditionally fall under the term "chocolate".

The first component may comprise an at least partially cooked component of chocolate. In some embodiments, the first component comprises chocolate crumb and/or condensed milk. Additionally, the first component may further comprise sugar, which may be substantially crystalline in form. The sugar crystals may be up to 100 µm in diameter.

The second component may comprise cocoa butter and/or cocoa mass. The second component may be in a liquid form if desired. Alternatively, the second component may be in a solid form, or a form which is solid at certain temperatures.

The body portion may comprise a plurality of capillaries and/or cavities.

The chocolate confectionery product may comprise components commonly used to produce dark, milk, white and compound chocolate—and these components will be apparent to the skilled addressee.

The chocolate confectionery product of the present invention can be produced containing all the ingredients of a regular chocolate, but is assembled in such a way that the product is supported by a matrix which may be formed by a cooked sweetened condensed milk and a fat/liquor being contained in the capillaries or cavities formed during extrusion.

Whilst the chocolate confectionery product of the present invention may not "eat" like traditional chocolate, it will provide a new eating experience with a crunch through the first component, followed by the release of the second component (butters and cocoa flavours) from the capillaries or cavities.

The one or more capillaries or cavities may extend along the substantially entire length of the body portion, but may in some embodiments extend no less than 75%, 80%, 90%, 95% or 99% along the length of the body portion (for example, when it is desired to seal the ends of the body portion). If the capillaries or cavities extend along the entire length of body portion, suitably the ends of the capillaries or cavities are visible at one or more ends of the body portion.

Different capillaries or cavities may incorporate different materials if desired. If desired, the one or more capillaries or cavities may additionally comprise a third component. Such a third component may include, but are not limited to, aqueous media, fats, chocolate, caramel, cocoa butter, fondant, syrups, peanut butter, jam, jelly, gels, truffle, praline, chewy candy, hard candy or any combination or mixture thereof.

If desired, the product may further comprise a coating portion to envelop the body portion. The skilled addressee will appreciate that a number of coatings could be employed.

The body portion may be connected to one or more further chocolate confectionery portions. In some embodiments, the body portion is sandwiched between confectionery materials or may be connected or laminated to one or more chocolate confectionery layers.

In some embodiments, the capillaries or cavities are distributed substantially uniformly throughout the body portion, and may be spaced evenly apart from adjacent capillaries or cavities. In other embodiments, the capillaries or cavities may be distributed in pre-defined configurations within the body portion, such as around the periphery of the body portion, or in groups at one or more locations within the body. In some embodiments the body portion has a circular, elliptical, regular polygonal or semi-circular cross-section. The body portion may be shaped in the form of a cylinder, a rope, a filament, a strip, a ribbon or the like, or may be shaped in the form of a standard chocolate confectionery product such a chocolate bar.

The shape of the body portion may be generally rounded or polygonal in cross-section.

The capillaries may have different widths or diameters. Such an arrangement will allow, if desired, for different quantities of different fill materials to be incorporated into different capillaries. Furthermore, the capillaries may have different cross-sectional profiles. For example, the confectionery product may have capillaries having a cross-sectional shapes including stars and triangles, or different shapes of animals etc.

The body portion may incorporate a central cavity. If such a central cavity is provided, it may have a width or diameter which is larger than the capillaries.

In an embodiment, the one or more capillary or cavity in the body portion results in a voidage in the range of 1-99% or 5-99% of the extrudate. The voidage may be in the range of 10-60%, 20-50%, 30-45%, or 35-40%. The voidage may also be in intermediate points in these ranges, for example, 5-40%, 5-45%, 5-50%, 5-60%, 10-40%, 10-45%, 10-50%, 10-99%, 20-60%, 20-45%, 20-40%, 20-60%, 20-99%, 30-40%, 30-50%, 30-60% or 30-99%. The voidage may be up to 99%, 95%, 90%, 80%, 60%, 50%, 45%, 35%, 30%, 20%, 10%, or 5%. The voidage may be over 5%, 10%, 15%, 20%, 25%, 30%, 35%, 40%, 45%, 50%, 55%, 60%, 65%, 70%, 75%, 80%, 85%, 90% or 95%.

As a standard chocolate recipe contains approx 28% by dry weight of cocoa butter and non fat cocoa solids, this can be easily accommodated in the capillary or cavities having the above voidage.

The incorporation of capillaries or cavities of a small cross-sectional width or diameter enables the capillaries or cavities to entrain contrasting or complementary confectionery materials into the body portion whilst avoiding the need to incorporate large centre-fill areas which may be prone to leakage through, or out of, the product. The use of a plurality of capillaries or cavities also enables two or more materials (one of which being the second component) to be incorporated into the confectionery product to give multiple textures, tastes, colours and/or mouth-feel sensations, throughout the whole product.

In some embodiments, the capillaries or cavities have a diameter or width of no more than, 2 mm, 1 mm, 0.5 mm, 0.25 mm or less. It is possible to have capillaries or cavities having a diameter or width of no more than 100 μm, 50 μm or 10 μm.

The confectionery product may comprise a first extruded portion and a second extruded portion, wherein each portion has one or more capillaries or cavities disposed therein, and the capillaries or cavities of the first and second portions are:
  a) discontinuous; and/or
  b) continuous and oriented in more than one direction.

The capillaries or cavities of each portion may be formed substantially parallel to one another. In one embodiment, the first and second portions are in a stacked configuration, such that the capillaries or cavities of the first and second portions are substantially parallel to each other. In an alternative embodiment, the first and second portions are in a folded configuration. In yet another alternative embodiment, the first and second portions are discontinuous and the capillaries or cavities are oriented in a random configuration in relation to one another. In some embodiments, the capillaries or cavities of the first and/or second portions have a diameter or width of no more than, 3 mm, 2 mm, 1 mm, 0.5 mm, 0.25 mm or less. It is possible to have capillaries or cavities having a diameter or width as low as 100 μm, 50 μm or 10 μm. The capillaries or cavities of the first and/or second portions may have different widths or diameters.

There may be further portions in addition to the first and second portions, which may or may not comprise capillaries or cavities. In one embodiment, the confectionery product comprises the first portion separated from the second portion by one or more further portions that may or may not contain capillaries or cavities.

According to a further embodiment, there is provided a process for manufacturing a chocolate confectionery product comprising a body portion, having one or more capillaries or cavities disposed therein, the process comprising the steps of:
  a) extruding an extrudable first chocolate component with one or more capillaries or cavities disposed therein; and
  b) depositing a second chocolate component in at least part of one or more of the capillaries or cavities,
  the first component being more stable at elevated temperatures than the second component.

In some embodiments, the method may include an extra step selected from:
  c) cutting the extrudate into two or more pieces having one or more capillaries or cavities disposed therein and forming a chocolate confectionery product incorporating the pieces; and/or
  d) folding the extrudate and forming a chocolate confectionery product incorporating the folded extrudate.

The deposition of the second component may be during the step of extrusion—but could also take place after extrusion. The filling may comprises a liquid or a solid, or a material which is liquid at a temperature greater than room temperature. The fluid may solidify after deposition if desired.

The first component may comprise an at least partially cooked component of chocolate. The first component may comprise chocolate crumb and/or condensed milk. If desired, the first component further comprises sugar.

The second component may comprise cocoa butter and/or cocoa mass.

The body portion may comprise a plurality of capillaries and/or cavities.

During extrusion, further drying or further cooking of the product may be required so as to provide stabilisation. Therefore, the extruder may form a cooking extruder with a vacuum port if desired.

Any of the processes may further comprise the step of quench cooling the extrudate after extrusion. The quench cooling may utilise a fluid, such as air, an oil or liquid nitrogen—but other methods of quench cooling will also be apparent to the skilled addressee.

Any of the processes may further comprise the step of, after extrusion, stretching the extrudate. Stretching the extrudate may be undertaken by a number of means, for example passing the extrudate over, or through conveyor belts or rollers operating at different speeds, so as to stretch the extrudate. By employing this additional step, extrusions having capillaries or cavities of a larger diameter can be undertaken, which can be reduced in diameter gradually over time so as to produce an extrudate with smaller capillaries or cavities which would have been more difficult to produce. Commonly, capillaries or cavities having a bore size of 2 mm or more will be produced during extrusion and these capillaries will be reduced significantly by stretching the extrudate. In some embodiments the capillaries or cavities are reduced to no more than 1 mm, 0.5 mm, 0.25 mm, 100 μm, 50 μm, 25 μm or 10 μm.

Any of the processes may further comprise the step of enveloping the chocolate confectionery product in a coating. Such a coating will be apparent to the skilled addressee and discussed previously.

The processes may be used for producing a confectionery material as herein above described.

A further embodiment of the present invention provides for apparatus which is adapted for producing a chocolate confectionery product according to the processes as herein above described. WO2005056272 discloses an apparatus for producing an extrudated product including a plurality of capillary channels. WO2008044122 discloses a related apparatus, which additionally includes means for quench cooling an extrudate as it exits the die. The die may be heated so as to heat the extrudate if additional cooking of the first and/or second component is required prior to quenching. Both of these apparatus may be employed/adapted for use in producing the confectionery in accordance with the present invention.

DETAILED DESCRIPTION OF THE INVENTION

Specific embodiments of the present invention will now be described, by way of example only, with reference to the accompanying drawings, in which:

FIG. 10A shows a perspective view of an extrudate formed in accordance with the present invention, where the extrudate has been folded;

FIG. 10B shows a cross-sectional view of the extrudate as shown in FIG. 10A, viewed from the line denoted "X"; and FIG. 11 shows a perspective view of an extrudate formed in accordance with the present invention, where a number of extrudated layers have been stacked upon one another.

Experiments were conducted to produce a chocolate confectionery product incorporating capillaries.

The extrusion equipment consisted of a Betol single screw extruder, with a screw diameter of approximately 12 mm, and a screw L/D ratio of roughly 22.5:1. The extruder had four different temperature zones (denoted T1-T4 in FIG. 1 as described later), each of which could be independently controlled using PID controllers connected to band heaters. The Mk 3 MCF extrusion die, containing an entrainment array consisting of 17 hypodermic needles, was connected on the extruder endplate. Two opposed air jets, used to rapidly quench the extrudate emerging from the extrusion die, were placed above and below the die exit; these jets were connected via a valve to a compressed air line at 6 Barg. A schematic diagram showing the general layout of the extrusion line is shown in FIG. 1 and a schematic drawing of the capillary die is shown in FIG. 2.

Figure 1:
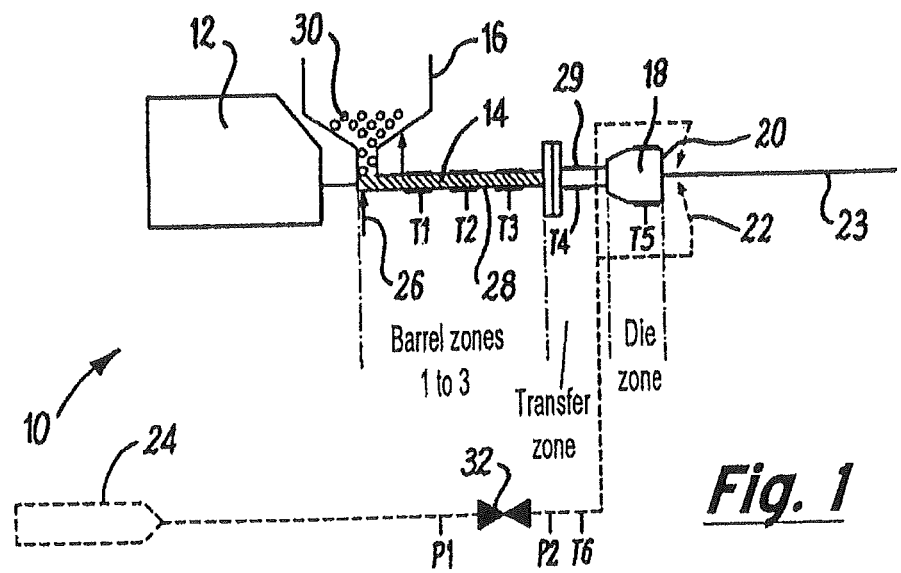
FIG. 1 is a schematic diagram illustrating the overall apparatus used in the experiments, in accordance with the present invention.

With reference to FIG. 1, there is shown a schematic diagram of the extrusion apparatus 10 used in the experiments. The apparatus briefly comprises an electric motor 12 which is rotatably coupled to an extrusion screw 14. The screw 14 is fed at one end by a hopper 16 and the opposing end is coupled to an extrusion die 18 having an extrudate outlet 20. Quench jets 22 are directed towards the die outlet 20 so as to cool the extruded material 23 which is produced and these jets are fed with compressed air 24. If desired, the area of the apparatus where the hopper 16 is coupled to the screw 14 can be cooled by means of a cooling feed 26. Surrounding the screw 14 is a barrel 28 which is formed having three barrel temperature zones denoted T1 to T3—the temperatures of each zone being capable of being controlled. The barrel 28 is connected to the die 18 by means of a feed conduit 29 which also has a temperature zone T4 which can be controlled.

In use, the hopper 16 is filled with material 30 (such as chocolate crumb) which can be heated so as to render it (or maintain it as) a liquid. Before the material passes into the screw 14, it can be cooled by means of the cool feed 26, so as to ensure that the material is at the correct temperature for entering the screw extruder. As the screw is rotated, the liquid material is drawn along the screw 14, inside the barrel 28 and the temperature of the zones T1-T3 adjusted accordingly. The material then passes through the feed conduit 29 and the temperature adjusted again (if required) by temperature control T4 before entering the die 18. The die 18 (shown in FIG. 3) has a number of needles (not shown) located within an entrainment body so that the material passes over and around the needles. At the same time that the material is being extruded, compressed air 24 is forced through the needles so that the extrudate contains a number of capillaries. The extrudate 23 is cooled by means of the quench jets 22 as it is released from the die 18. A valve 32 controls the flow of compressed air to the apparatus and pressure devices P1 and P2 control the pressure of the compressed air 24 before and after the valve. The compressed air line also has a temperature control T6 so as to control the temperature of the air before entering the die.

Figure 2:
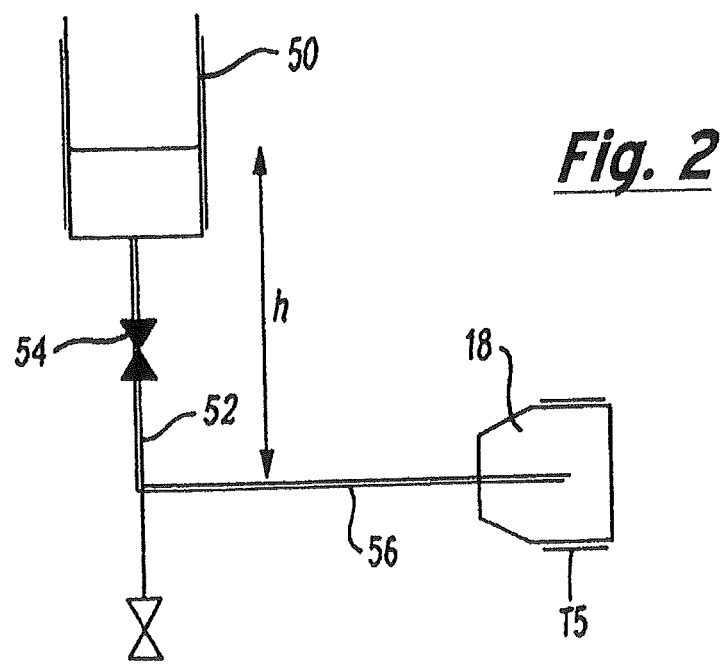
FIG. 2 is a schematic diagram illustrating the apparatus which can be used in conjunction with the apparatus shown in FIG. 1, so as to provide a liquid filled capillaries.

With reference to FIG. 2, there is shown an adaptation of the apparatus shown in FIG. 1. Rather than compressed air 24 being forced through needles, the needles are connected to a reservoir 50 containing cocoa butter. The reservoir 50 is heated so that the cocoa butter is maintained at the correct temperature so as to maintain it in a liquid state. The reservoir 50 is connected to a conduit 52 having an isolation valve 54 for controlling the flow of liquid. The conduit 52 is encased is in a trace heating tube 56 which maintains the temperature of the conduit so that the liquid remains in a liquid state during its movement within the conduit. The conduit 52 is coupled to the inlet to the die 18 having number of needles, so that when the material is being extruded, the capillaries formed around and the needles can be simultaneously filled with cocoa butter. Of course, the capillaries could be filled with other types of liquid material if desired.

Figure 3:
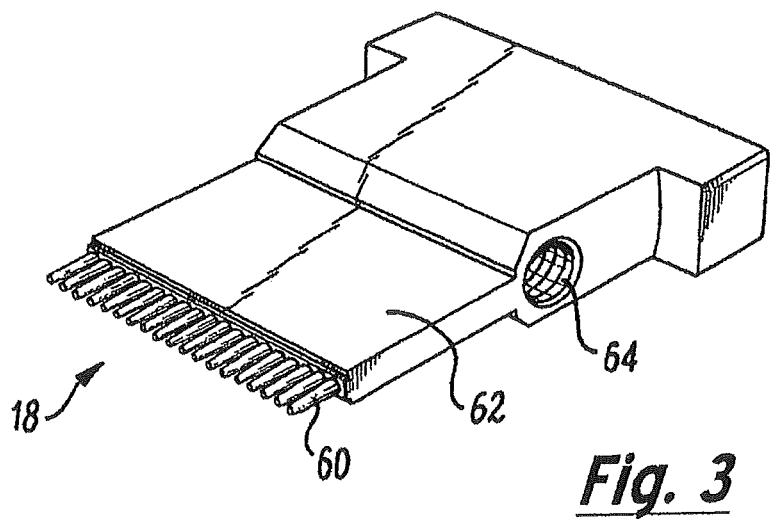
FIG. 3 is a photograph of the extrusion die used to form capillaries in the extruded material formed during the experiments.

FIG. 3 shows the die 18 in more detail. In particular, this figure shows that the metallic die 18 has, at one end, a plurality of needles 60 which are joined to a cavity 62 which is in fluid communication with an inlet channel 64 for pumping a fluid material into the capillaries of the extrusion.

Figure 4:
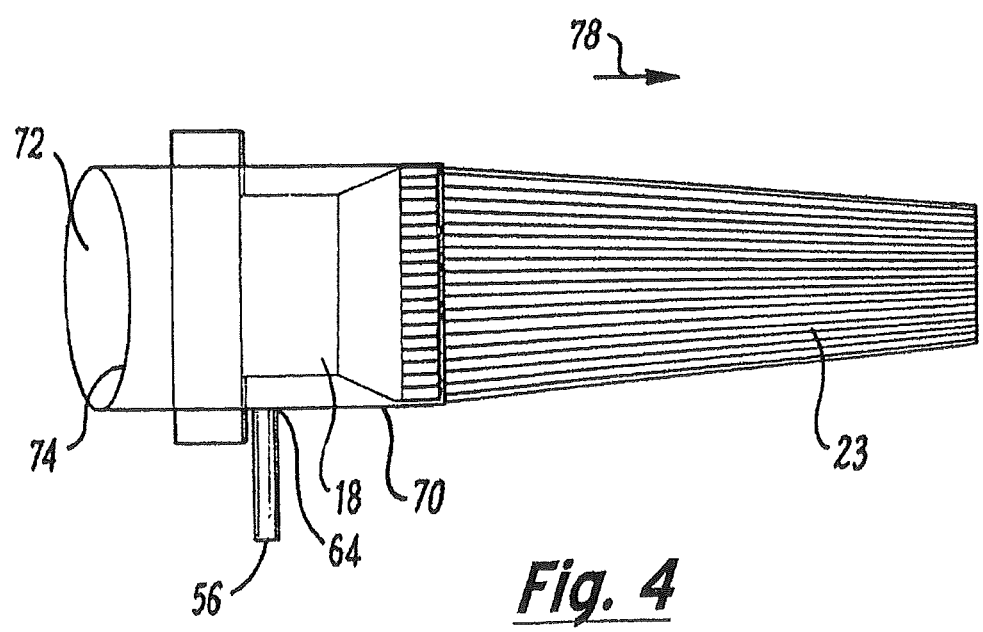
FIG. 4 is a plan view of the extrusion die which incorporates the extrusion die shown in FIG. 3 in the apparatus as illustrated in FIGS. 1 and 2.
Figure 5:
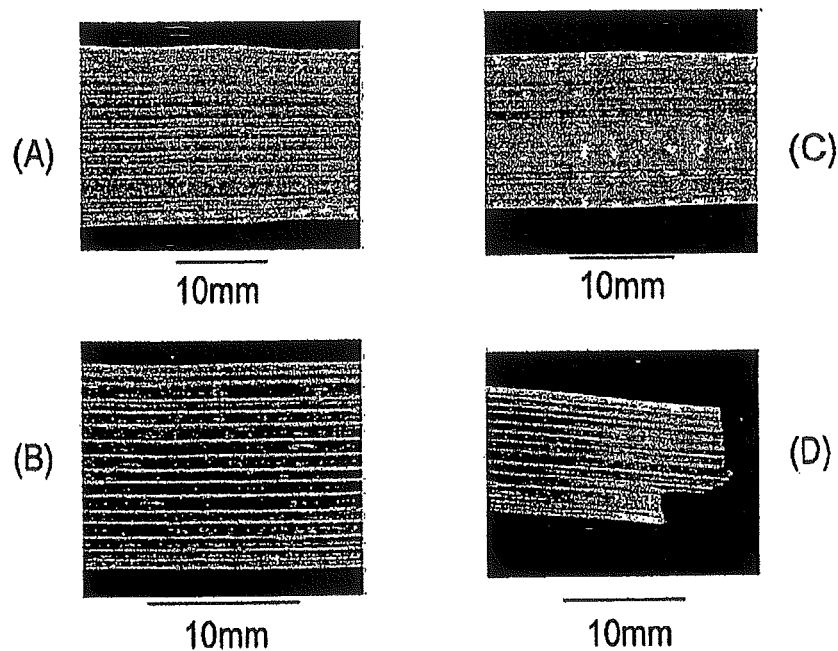
FIG. 5 shows photographs of four capillary extrudates formed from during the experiments—the photographs show; (A) low voidage, (B) and (C) high voidage and (D) very high voidage.
Figure 6:
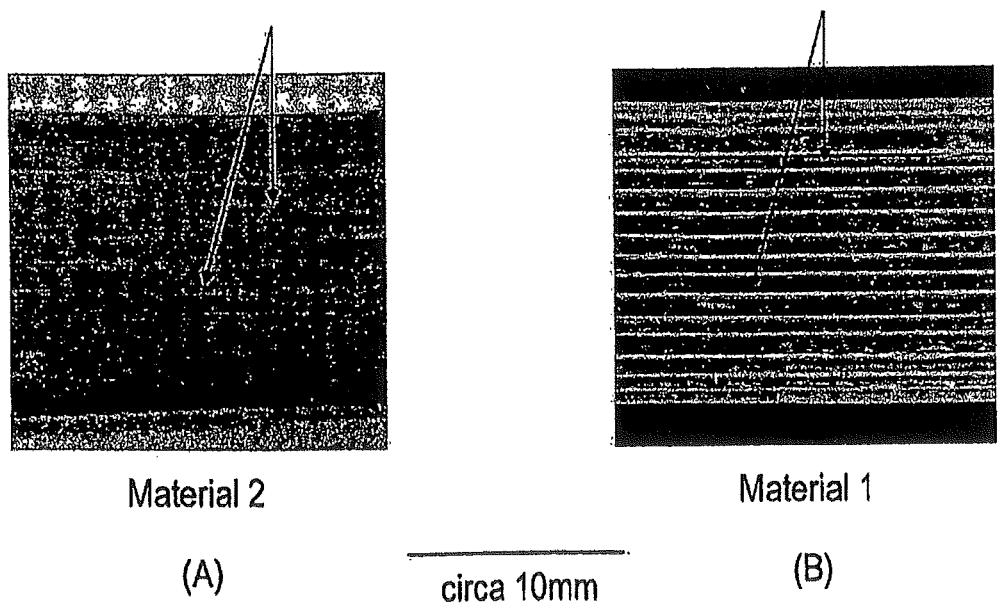
FIG. 6 shows photographs comparing capillary extrudates formed from (A) material containing completely filled cocoa butter capillaries and (B) material formed with air filled capillaries.

With reference to FIG. 4, there is shown the die 18 in place in an entrainment body 70. Molten/crumb material 72 enters an opening 74 of the entrainment body 70 and the material is forced over and around the needles 60 of the die 18. At the same time, either air or liquid cocoa butter enters the die inlet by means of a fluid feed conduit 56. When operational, the molten/crumb material is extruded through the entrainment body 70 over the needles 60 of the die 18. Either air or cocoa butter is then pumped through the needles at the same time so as to produce an extrudate 23 (in direction 78) which either has capillaries with no filling or capillaries filled with cocoa butter.

Figure 7:
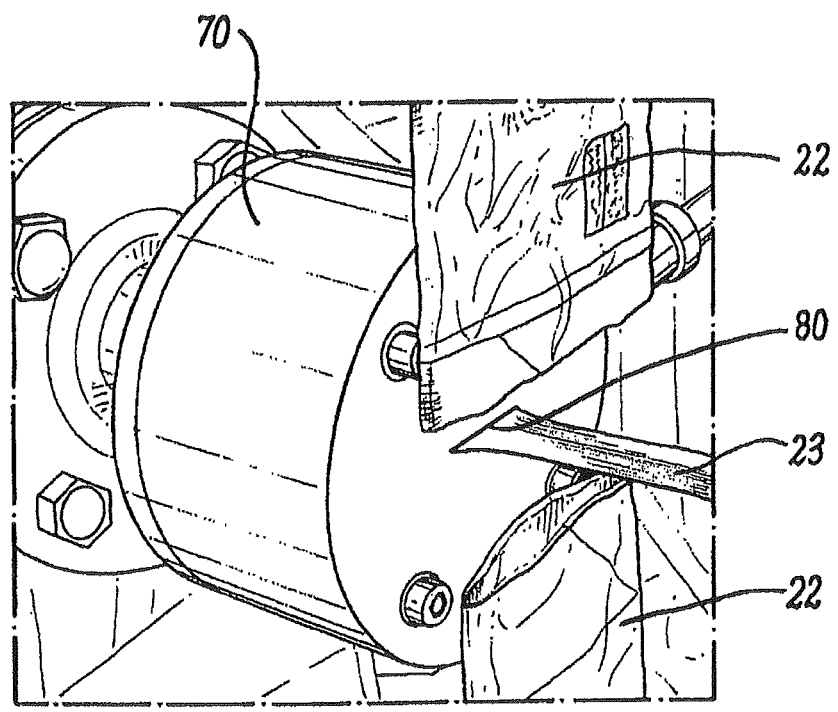
FIG. 7 shows a photograph of the external part of the extrusion apparatus as illustrated in FIGS. 1 and 2, showing the air knives used to cool the extrudate when it exist the die.

FIG. 7 shows the entrainment body 70 having an opening 80, through which the extrudate is formed. This figure also shows two quench jets 22 located above and below the aperture so as to cool down the extrudate after is has been produced.

In use, the flow of molten/crumb material over the tips of the entrainment nozzles (hypodermic needles) caused a small area of low pressure to form at each needle tip. Each nozzle was connected together via internal channelling within the entrainment body. These, in turn, were connected outside the extrusion die to either air at room temperature and pressure or to a molten cocoa butter reservoir, with a hydraulic head of h in FIG. 2. The pipework connecting the die to the cocoa butter reservoir and the cocoa butter reservoir was externally heated to maintain the cocoa butter in the liquid phase. A set of isolation valves were used to switch between either using an air feed to the entrainment body or a molten cocoa butter feed. This is shown schematically in FIG. 2.

The quench jets were used for the generation of the high-voidage material. Differential scanning calorimetry (DSC) was used to examine the thermal behaviour of the materials, such that information relating to the phase transition temperatures could be obtained.

Experiments were conducted to produce extruded chocolate using the following components: chocolate (milk chocolate (with 0, ½, 1, 2% added water), Cadbury® Dairy Milk® Buttons—when used molten, 2% PGPR was added to lower the melt viscosity for ease of use (c.f. legal limit of ½%)), compound chocolate (Plain Belgian Chocolate, Super-Cook®), 72% Cook's Chocolate, Green & Black's®. and a solid filling of cocoa butter obtained internally from a Cadbury Plc. site was also used in these experiments and this was selected because it is solid at room temperature and has low hot viscosity.

A Davis-Standard HPE-075 ¾ 24:1 single-screw extruder was used in these experiments. The extruder also included air-knives and a header tank. The screw was a simple conveying-compression-pumping all forward element design, with no mixing or reversing sections. The motor was 3 KW, geared to produce 0-100 rpm screw rotation. The feed throat was jacketed and supplied with flowing ambient water to prevent heat transfer from the barrel causing feed problems with sticky feedstuff. The barrel had three heating zones, each with a 1 KW heater and forced ambient air cooler. The standard extruder has a Eurotherm 3216 controller per barrel zone and one spare for the die (die controller connected to thermocouple input and standard 16 A 240 v socket for up to 1 KW heater output).

At point of purchase, two additional die controllers, thermocouple inputs and heater outputs were specified to enable integrated control of the header tank containing filling material and the pipework connecting that header tank to the die. The die was an assembly of parts comprising a body with main die orifice of long thin rectangular shape, through which 19 interconnected nozzles (similar in size to hypodermic needles) also exited. The main body was heated and the nozzles led to an external fitting that could be opened to ambient air or could be connected to the heated, pressurized header tank. A bobbin shaped flange was constructed to mount the die assembly onto the extruder end flange.

The die was heated with 4×100 W ¼" cartridge heaters, and monitored by a K-type thermocouple probe. Initially these were controlled by a Eurotherm 3216 in a bespoke enclosure until the control and power wiring was transferred to a Eurotherm integrated into the extruder. The die assembly was earthed into the power outlet from the extruder.

The header-tank and the pipework connecting the header tank to the die were heated with two 100 W ribbon heaters initially controlled from a single analogue controller in a bespoke enclosure, and monitored by a single bare K-type thermocouple. These were later separated to two Eurotherm 3216s integrated into the extruder with two thermocouples and two power supplies. The header tank was earthed to the power outlet, whilst the pipework was plastic and did not need to be earthed.

Compressed air, BOC®, UK was regulated with series 8000 gas regulator and pressures used were 0-10 bar. The main use for the compressed air was to supply the air-knives.

Food Safe High-Tech Grease, and Food Safe Penetrating Oil from Solent Lubricants, Leicester, UK was used.

The capillary die was connected on the extruder endplate. Two opposed air knives were used to rapidly quench the extrudate emerging from the extrusion die, were placed above and below the die exit; these jets were connected via a valve to a compressed air line at 10 bar pressure. A schematic diagram showing the general layout of the extrusion line is shown in FIG. 1.

In use, the flow of molten material over the tips of the entrainment nozzles (hypodermic needles) caused a small area of low pressure to form at each needle tip. Each nozzle was connected together via internal channelling within the entrainment body. This, in turn, was connected outside the extrusion die to either air at room temperature and pressure or to a header tank containing a liquid that was at ambient or elevated temperature and pressure, with a hydraulic head of h.

The header tank and the pipework connecting to the die were externally heated. A set of isolation valves were used to switch between either using an air feed to the entrainment body or a molten cocoa butter feed. This is shown schematically in FIG. 2.

The quench jets were used for the generation of the high-voidage material. It had been found during previous research that if the emerging extrudate was quenched very rapidly and subjected to a high drawing force, a higher voidage cross section could be obtained. Adjustment of the polymer and process conditions yielded voidages up to, and possibly in excess of, 60%.

Chocolate was used as material for extrusion. To gain stable running conditions, the heaters and cooling fans of the extruder were electrically disabled. Direct temperature control was abandoned in favour of relying on the air conditioning of the laboratory. With these modifications the extruder barrel indicated an even 22° C. and it was simple to extrude capillary chocolate in a steady state using molten tempered Cadbury's Dairy Nike chocolate.

It was possible to draw the chocolate extrudate so as to alter the cross sectional geometry, and produce capillaries having diameters or widths of between 0.5 mm and 4 mm.

Figure 8:
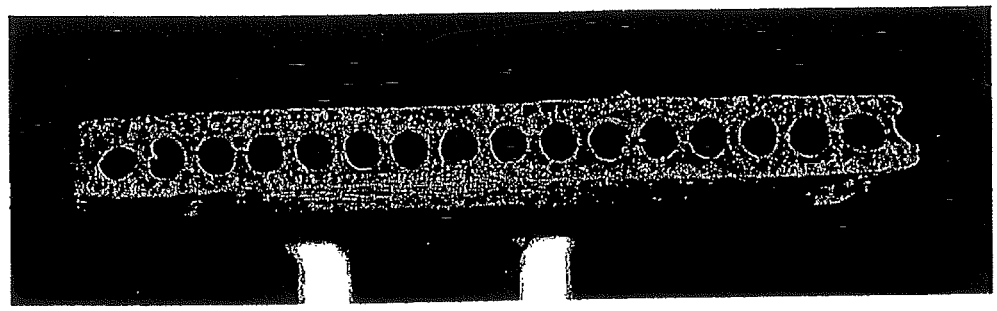
FIG. 8 shows a chocolate with an air fill, produced in accordance with the present invention.
Figure 9:
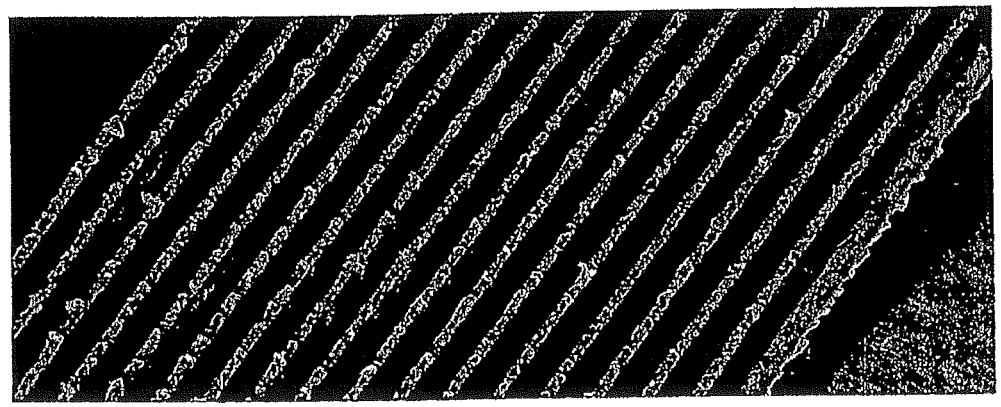
FIG. 9 shows a chocolate with an air fill as shown in FIG. 8, but in longitudinal cross section.

Air filling was achieved through a simple ambient air-bleed to the nozzles in the die and a cross section of the extrudate is shown in FIG. 8.

The extrudates of the present invention could be configured in a number of ways. For example, FIGS. 15A and 15B show an extrudate 100 made from chocolate crumb having centre filled capillaries 102 made from cocoa butter, where the extrudate is folded back on it self several times. Such a configuration would enable an extended release of centre fill during chewing.

FIG. 16, shows multiple layers of extrudate 120 being stacked on top of one another and each stack having a plurality of capillaries 122 with a centre filling.

The foregoing embodiments are not intended to limit the scope of protection afforded by the claims, but rather to describe examples as to how the invention may be put into practice.

The invention claimed is:

1. A chocolate confectionery product comprising
an extruded body portion, the body portion having at least one capillary or cavity disposed therein,
the extruded body portion comprising a first component of chocolate and the capillary or cavity containing a second component of chocolate,
wherein the first and second components jointly comprise all ingredients used to make chocolate and wherein the components of chocolate are separated within the confectionery product such that the extruded body portion and the fill contained within the capillary or cavity individually do not comprise all ingredients required to make chocolate,
wherein the chocolate is dark, milk, or white chocolate; and
wherein the first component is more stable at elevated temperatures than the second component.

2. A chocolate confectionery product as claimed in claim 1, wherein the first component further comprises sugar.

3. A chocolate confectionery product as claimed in claim 2, wherein the sugar is in a substantially crystalline form.

4. A chocolate confectionery product as claimed in claim 2, wherein the second component comprises cocoa butter and/or cocoa mass.

5. A confectionery product as claimed in claim 1, wherein the body portion comprises a plurality of capillaries and/or cavities.

6. A chocolate confectionery product as claimed in claim 1, wherein the second component comprises a liquid.

7. A chocolate confectionery product as claimed in claim 1, wherein the second component comprises a solid.

8. A chocolate confectionery product as claimed in claim 1, wherein the product further comprises a coating portion to envelop the extruded body portion.

9. A chocolate confectionery product as claimed in claim 1, wherein the one or more capillaries or cavities in the extruded body portion result in a voidage in the range of 5-99%.

10. A chocolate confectionery product as claimed in claim 1, wherein the extruded body portion comprises capillaries or cavities having an average diameter or width of no more than 3 mm.

11. A chocolate confectionery product as claimed in claim 1, where the body portion comprises a first extruded portion and a second extruded portion, wherein each portion has one or more capillaries or cavities disposed therein, and the capillaries or cavities of the first and second portions are:
a) discontinuous; and/or
b) continuous and oriented in more than one direction.

12. A chocolate confectionery product as claimed in claim 11, wherein the capillaries or cavities of each portion are formed substantially parallel to one another.

13. A chocolate confectionery product as claimed in claim 11, wherein the first and second portions are in a stacked configuration, such that the capillaries or cavities of the first and second portions are substantially parallel to each other.

14. A chocolate confectionery product as claimed in claim 11, wherein the first and second portions are in a folded configuration.

15. A chocolate confectionery product as claimed in claim 11, wherein the first and second portions are discontinuous and the capillaries or cavities are oriented in a random configuration in relation to one another.

16. A process for manufacturing a chocolate confectionery product comprising an extruded body portion having one or more capillaries or cavities disposed therein, the process comprising the steps of:
a) extruding an extrudable first component of chocolate with one or more capillaries or cavities disposed therein, the first component comprising an at least partially cooked component of chocolate, and/or chocolate crumb and/or condensed milk; and
b) depositing a second component of chocolate in at least part of one or more of the capillaries or cavities,
wherein the first and second components jointly comprise all ingredients used to make chocolate and wherein the components of chocolate are separated within the confectionery product such that the extruded body portion and the capillary or cavity individually do not comprise all ingredients required to make chocolate,
wherein the chocolate is dark, milk, or white chocolate; and
wherein the first component is more stable at elevated temperatures than the second component.

17. A process as claimed in claim 16, further comprising a step selected from:
c) cutting the extrudate into two or more pieces having one or more capillaries or cavities disposed therein and forming a chocolate confectionery product incorporating the pieces; and/or
d) folding the extrudate and forming a chocolate confectionery product incorporating the folded extrudate.

18. A process as claimed in claim 16, wherein the second component is deposited during the step of extrusion.

19. A process as claimed in claim 16, wherein the first component further comprises sugar.

20. A process as claimed in claim 16, wherein the second component comprises cocoa butter and/or cocoa mass.

21. A confectionery product as claimed in claim 16, wherein the body portion comprises a plurality of capillaries and/or cavities.

22. A process as claimed in claim 16, wherein the process further comprises the step of quench cooling the extrudate after extrusion.

23. A process as claimed in claim 22, wherein the quench cooling uses a fluid.

24. A process as claimed in claim 16, wherein the process further comprises the step of, after extrusion, stretching the extrudate.

25. A process as claimed in claim 16, wherein the process further comprises the step of enveloping the chocolate confectionery product in a coating.

26. A process as claimed in claim 16, wherein the process is for producing a chocolate confectionery material as claimed in claim 1.

27. An apparatus adapted for producing a chocolate confectionery product according to the process claimed in claim 16.

* * * * *